US 11,548,088 B2

(12) United States Patent
Guymon et al.

(10) Patent No.: US 11,548,088 B2
(45) Date of Patent: Jan. 10, 2023

(54) SYSTEMS AND METHODS FOR WELDING TORCH WEAVING

(71) Applicant: Lincoln Global, Inc., Santa Fe Springs, CA (US)

(72) Inventors: Lance F. Guymon, Fort Collins, CO (US); Adewole Adekola Ayoade, Golden, CO (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 358 days.

(21) Appl. No.: 16/161,255

(22) Filed: Oct. 16, 2018

(65) Prior Publication Data

US 2019/0160577 A1    May 30, 2019

Related U.S. Application Data

(60) Provisional application No. 62/592,072, filed on Nov. 29, 2017.

(51) Int. Cl.
*B23K 9/12* (2006.01)
*B23K 9/095* (2006.01)
(Continued)

(52) U.S. Cl.
CPC .............. *B23K 9/126* (2013.01); *B23K 9/091* (2013.01); *B23K 9/095* (2013.01); *B23K 9/0953* (2013.01);
(Continued)

(58) Field of Classification Search
CPC ......... B29C 2045/0039; B29C 45/0025; B29L 2031/7282; B60N 2/5825; B60N 2/5891;
(Continued)

(56) References Cited

U.S. PATENT DOCUMENTS 4,642,752 A    2/1987 Debarbieri et al.
4,952,772 A    8/1990 Zana
(Continued)

FOREIGN PATENT DOCUMENTS

CN    104741778 B    7/2015
CN    106772243 A    5/2017
(Continued)

OTHER PUBLICATIONS

Partial European Search Report from Corresponding Application No. 18208892.2; dated Jun. 12, 2019; pp. 1-13.
(Continued)

*Primary Examiner* — Justin C Dodson
*Assistant Examiner* — Dilnessa B Belay
(74) *Attorney, Agent, or Firm* — Brad C. Spencer

(57) ABSTRACT

A robotic electric arc welding system includes a welding torch, a welding robot configured to manipulate the welding torch during a welding operation, a robot controller operatively connected to the welding robot to control weaving movements of the welding torch along a weld seam and at a weave frequency and weave period, and a welding power supply operatively connected to the welding torch to control a welding waveform, and operatively connected to the robot controller for communication therewith. The welding power supply is configured to sample a plurality of weld parameters during a sampling period of the welding operation and form an analysis packet, and process the analysis packet to generate a weld quality score, wherein the welding power supply obtains the weave frequency or the weave period and automatically adjusts the sampling period for forming the analysis packet based on the weave frequency or the weave period.

19 Claims, 14 Drawing Sheets

(51) Int. Cl.
| | |
|---|---|
| *B23K 9/127* | (2006.01) |
| *B25J 9/16* | (2006.01) |
| *B23K 9/10* | (2006.01) |
| *G05B 19/418* | (2006.01) |
| *B23K 31/00* | (2006.01) |
| *B23K 31/12* | (2006.01) |
| *B23K 37/00* | (2006.01) |
| *B25J 11/00* | (2006.01) |
| *B23K 9/09* | (2006.01) |
| *B23K 9/133* | (2006.01) |
| *B23K 10/02* | (2006.01) |
| *B23K 26/342* | (2014.01) |
| *B23K 15/00* | (2006.01) |
| *B23K 9/04* | (2006.01) |

(52) U.S. Cl.
CPC ........ *B23K 9/0956* (2013.01); *B23K 9/1062* (2013.01); *B23K 9/1087* (2013.01); *B23K 9/127* (2013.01); *B23K 9/1276* (2013.01); *B23K 9/133* (2013.01); *B23K 31/003* (2013.01); *B23K 31/125* (2013.01); *B23K 37/00* (2013.01); *B25J 9/163* (2013.01); *B25J 9/1661* (2013.01); *B25J 9/1664* (2013.01); *B25J 11/005* (2013.01); *G05B 19/41875* (2013.01); *B23K 9/04* (2013.01); *B23K 10/027* (2013.01); *B23K 15/0086* (2013.01); *B23K 26/342* (2015.10); *G05B 2219/31087* (2013.01); *G05B 2219/32194* (2013.01); *G05B 2219/32234* (2013.01); *G05B 2219/32397* (2013.01); *G05B 2219/45104* (2013.01)

(58) Field of Classification Search
CPC ..... F16B 2/22; B23K 10/027; B23K 15/0086; B23K 26/342; B23K 31/003; B23K 31/125; B23K 37/00; B23K 9/091; B23K 9/0953; B23K 9/0956; B23K 9/1062; B23K 9/127; B23K 9/133; G05B 2219/31087; G05B 2219/32194; G05B 2219/32234; G05B 2219/32397; G05B 2219/45104; G06Q 10/20; B25J 9/163
See application file for complete search history.

(56) References Cited

U.S. PATENT DOCUMENTS

| | | | |
|---|---|---|---|
| 5,887,122 A | 3/1999 | Terawaki et al. | |
| 6,335,511 B1 | 1/2002 | Rothermel | |
| 6,429,404 B1* | 8/2002 | Suzuki ................. | B23K 9/1276 219/124.34 |
| 6,441,342 B1 | 8/2002 | Hsu | |
| 6,486,439 B1 | 11/2002 | Spear et al. | |
| 6,583,386 B1 | 6/2003 | Ivkovich | |
| 6,624,388 B1 | 9/2003 | Blankenship et al. | |
| 6,795,778 B2 | 9/2004 | Dodge et al. | |
| 6,809,292 B2 | 10/2004 | Spear et al. | |
| 6,924,459 B2 | 9/2005 | Spear et al. | |
| 6,940,039 B2 | 9/2005 | Blankenship et al. | |
| 7,375,304 B2 | 5/2008 | Kainec et al. | |
| 7,853,435 B2 | 12/2010 | Dodge et al. | |
| 8,710,404 B2 | 4/2014 | Ma et al. | |
| 8,886,359 B2 | 11/2014 | Inaba et al. | |
| 8,987,628 B2 | 3/2015 | Daniel et al. | |
| 9,302,397 B2 | 4/2016 | Kimoto | |
| 9,415,457 B2 | 8/2016 | Daniel et al. | |
| 9,965,973 B2 | 5/2018 | Peters et al. | |
| 2003/0046382 A1 | 3/2003 | Nick | |
| 2008/0083716 A1 | 4/2008 | Shigeyoshi | |
| 2009/0179021 A1 | 7/2009 | Nishimura et al. | |
| 2012/0205359 A1* | 8/2012 | Daniel ................. | B23K 9/0953 219/130.01 |
| 2012/0234812 A1 | 9/2012 | Ma et al. | |
| 2014/0001168 A1* | 1/2014 | Cole ....................... | B23K 9/08 219/130.51 |
| 2014/0042136 A1 | 2/2014 | Daniel et al. | |
| 2014/0144896 A1 | 5/2014 | Einav et al. | |
| 2014/0263233 A1 | 9/2014 | Peters et al. | |
| 2016/0214198 A1 | 7/2016 | Hsu | |
| 2016/0361774 A9 | 12/2016 | Daniel et al. | |
| 2017/0046975 A1 | 2/2017 | Becker et al. | |
| 2020/0009673 A1* | 1/2020 | Fujii ................. | G05B 19/4063 |
| 2020/0198041 A1* | 6/2020 | Nishida ................. | B23K 9/127 |

FOREIGN PATENT DOCUMENTS

| | | |
|---|---|---|
| CN | 105728904 B | 1/2018 |
| CN | 207358424 U | 5/2018 |
| JP | S 58 168475 A | 3/1982 |
| JP | 5 421172 A | 2/2014 |
| WO | 90/00108 A1 | 1/1990 |
| WO | 2011/039542 A1 | 4/2011 |
| WO | 2013/160745 A1 | 10/2013 |
| WO | 2015/066592 A1 | 5/2015 |
| WO | 2016/064660 A1 | 4/2016 |
| WO | 2016/075518 A1 | 5/2016 |
| WO | 2016/090903 A1 | 6/2016 |

OTHER PUBLICATIONS

International Search Report from Corresponding Application No. PCT/IB2018/001359; dated Mar. 29, 2019; pp. 1-13.
Extended European Search Report from Corresponding Application No. 18208892.2; dated Dec. 16, 2019; pp. 1-13.
Wang; "Intelligent Predictive Maintenance (IPdM) System—Industry 4.0 Scenario;" WTT Transactions on Engineering Sciences; vol. 113; Dated Feb. 1, 2016; pp. 1-10.
Extended European Search Report from Corresponding Application No. EP20171703.0; dated Aug. 20, 2020; pp. 1-8.
Regaard, et al.; "Seam-tracking for high precision laser welding applications—Methods, restrictions and enhanced concepts"; Journal of Laser Applications; vol. 21, No. 4; Nov. 2009; pp. 1-14.
Zhang, et al.; "Measurement of Three-Dimensional Welding Torch Orientation for Manual Arc Welding Process;" •Measurement Science and Technology; vol. 25; Feb. 2014; pp. 1-19.
Lincoln Electric; "Robotics: Joint Sensing Technologies;" https://www.lincolnelectric.com/nl-nl/support/process-and-theory/Pages/intelligent-robotic-detail.aspx; Accessed on Jul. 13, 2018; pp. 1-6.
Garasic; "Sensors and their classification in the fusion weldingtechnology;" Tehnički vjesnik; vol. 22, 4; Aug. 2015; pp. 1-7.
WeldOBot; "WOB101;" http://weldobot.com/?portfolio=wob; Accessed on Jul. 10, 2018; p. 1.
Liu, et al.; "Linear Mathematical Model for Seam Tracking with an Arc Sensor in P-GMAW Processes;" Sensors (Basel); vol. 17(3); Mar. 2017; pp. 1-13.
Kim, et al.; "Arc Characteristics in Pulse-GMA Welding with Acute Groove Angles;" Supplement to the Welding Journal; Apr. 2012; pp. 101-105.
Extended European Search Report from Corresponding Application No. EP20171722.0; dated Oct. 13, 2020; pp. 1-8.
Extended European Search Report from Corresponding Application No. 18208898.9; dated Sep. 17, 2019; pp. 1-7.
Extended European Search Report from Corresponding Application No. 18208880.7; dated Sep. 17, 2019; pp. 1-8.

* cited by examiner

SYSTEMS AND METHODS FOR WELDING TORCH WEAVING

CROSS-REFERENCE TO RELATED APPLICATIONS

Benefit of U.S. Provisional Patent Application Ser. No. 62/592,072 filed Nov. 29, 2017, is hereby claimed and the disclosure incorporated herein by reference.

BACKGROUND OF THE INVENTION

Field of the Invention

The present invention relates to robotic arc welding, and in particular to weave welding performed by a welding robot.

Description of Related Art

It is known to calculate quality indicators during welding, to provide information on the acceptability of the resulting weld. It is also known to perform through arc seam tracking during robotic weave welding. However, the accuracy of through arc seam tracking may be negatively affected by the use of welding waveforms having pulse portions, due to frequently changing welding current levels.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a robotic electric arc welding system. The system includes a welding torch, a welding robot configured to manipulate the welding torch during a welding operation, a robot controller operatively connected to the welding robot to control weaving movements of the welding torch along a weld seam and at a weave frequency and weave period, and a welding power supply operatively connected to the welding torch to control a welding waveform, and operatively connected to the robot controller for communication therewith. The welding power supply is configured to sample a plurality of weld parameters during a sampling period of the welding operation and form an analysis packet, and process the analysis packet to generate a weld quality score, wherein the welding power supply obtains the weave frequency or the weave period and automatically adjusts the sampling period for forming the analysis packet based on the weave frequency or the weave period.

In certain embodiments, the sampling period for forming the analysis packet equals the weave period. In certain embodiments, the welding power supply receives the weave frequency from the robot controller. In certain embodiments, the welding power supply receives the weave period from the robot controller. In certain embodiments, the welding power supply receives torch position information from the robot controller during the welding operation. In further embodiments, the welding power supply automatically adjusts the sampling period for forming the analysis packet based on the torch position information. In certain embodiments, the welding power supply records through arc seam tracking information corresponding to the weld quality score. In certain embodiments, the system includes through arc seam tracking logic that tracks the weld seam and calculates corrections to a weld path from welding current data classified as corresponding to one of a pulse current portion and a low current portion of a welding waveform.

In accordance with another aspect of the present invention, provided is a robotic electric arc welding system. The system includes a welding torch, a welding robot configured to manipulate the welding torch during a welding operation, a robot controller operatively connected to the welding robot to control weaving movements of the welding torch along a weld seam and at a weave frequency and weave period, and a welding power supply operatively connected to the welding torch to control a welding waveform, and operatively connected to the robot controller for communication therewith. The welding power supply is configured to sample a plurality of weld parameters during a sampling period of the welding operation and form an analysis packet, and process the analysis packet to generate a weld quality score, wherein the welding power supply receives torch position information and automatically adjusts the sampling period for forming the analysis packet based on the torch position information.

In certain embodiments, the sampling period for forming the analysis packet equals the weave period. In certain embodiments, the welding power supply receives the weave frequency from the robot controller. In certain embodiments, the welding power supply receives the weave period from the robot controller. In certain embodiments, the welding power supply records through arc seam tracking information corresponding to the weld quality score. In certain embodiments, the system includes through arc seam tracking logic that tracks the weld seam and calculates corrections to a weld path from welding current data classified as corresponding to one of a pulse current portion and a low current portion of a welding waveform.

In accordance with another aspect of the present invention, provided is a robotic electric arc welding system. The system includes a welding torch, a welding robot configured to manipulate the welding torch during a welding operation, a robot controller operatively connected to the welding robot to control weaving movements of the welding torch along a weld path that follows a weld seam, and a welding power supply operatively connected to the welding torch to control a welding waveform, and operatively connected to the robot controller for communication therewith. The welding waveform includes a pulse current portion, and a low current portion having a lower current level than the pulse current portion. The robotic electric arc welding system includes through arc seam tracking logic that tracks the weld seam and calculates corrections to the weld path. The through arc seam tracking logic calculates the corrections to the weld path from welding current data classified as corresponding to one of the pulse current portion and the low current portion of the welding waveform and provided by the welding power supply.

In certain embodiments, the welding current data is classified by the welding power supply as corresponding to one of the pulse current portion and the low current portion of the welding waveform. In further embodiments, the welding current data is obtained by filtering welding current measurements according to a corresponding portion of the welding waveform. In certain embodiments, the welding current data is classified by the welding power supply as corresponding to either one of the pulse current portion and the low current portion of the welding waveform. In further embodiments, the welding current data is segmented according to either one of the pulse current portion and the low current portion of the welding waveform. In further embodiments, the welding current data is tagged as corresponding to either one of the pulse current portion and the low current portion of the welding waveform. In certain embodiments, the welding power supply is configured to sample a plurality of weld parameters during a sampling period of the welding operation and form an analysis packet, and process the analysis packet to generate a weld quality score, wherein the welding power supply obtains a weave frequency or a weave period of the weaving movements and automatically adjusts the sampling period for forming the analysis packet based on the weave frequency or the weave period.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
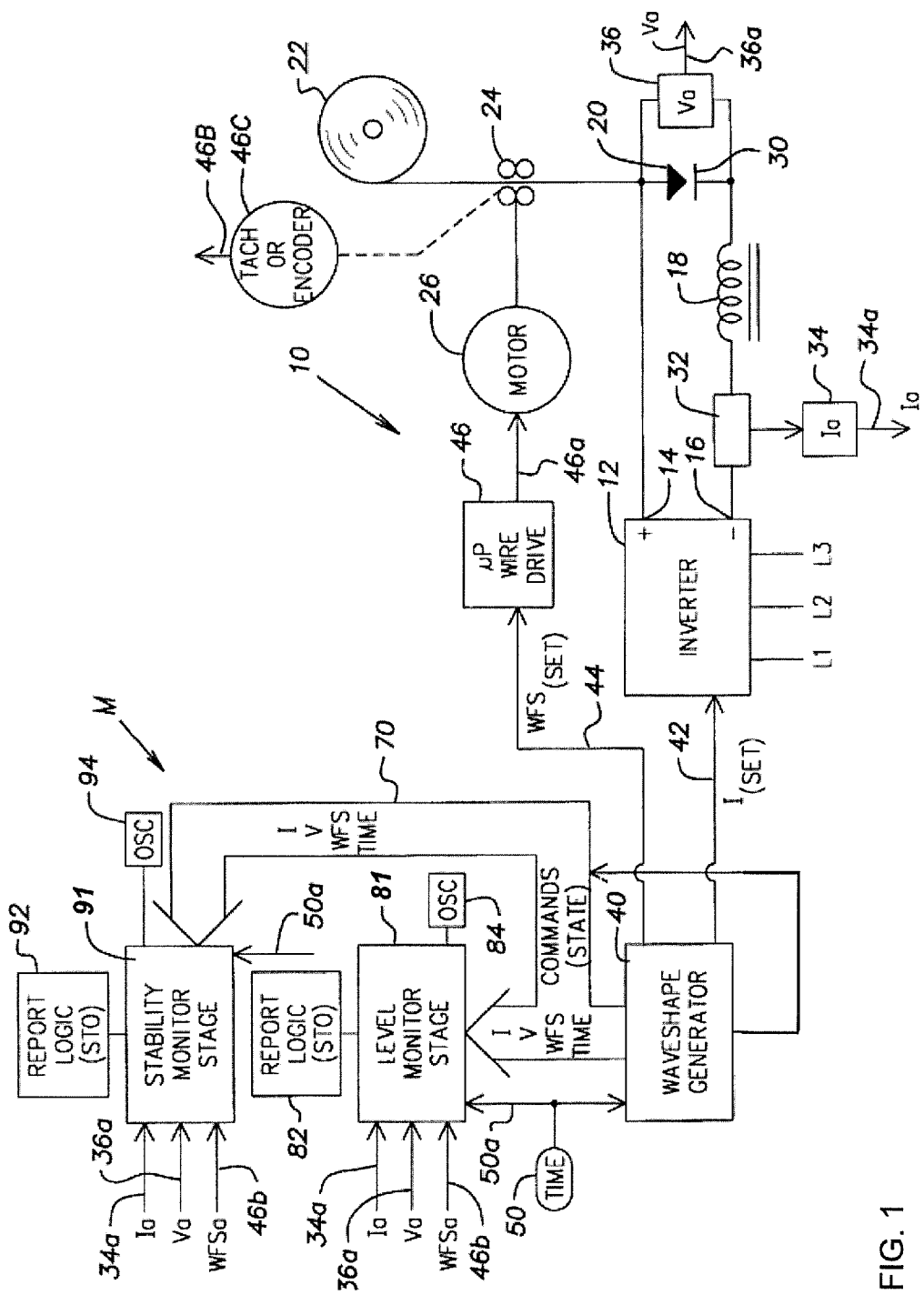
FIG. 1 is a combined block diagram and computer flow chart or program illustrating a monitor of an arc welder, according to one exemplary embodiment.

While the general inventive concepts are susceptible of embodiment in many different forms, there are shown in the drawings and will be described herein in detail specific embodiments thereof with the understanding that the present disclosure is to be considered as merely an exemplification of the principles of the general inventive concepts. Accordingly, the general inventive concepts are not intended to be limited to the specific embodiments illustrated herein. Furthermore, the disclosure of U.S. Pat. No. 8,987,628 issued on Mar. 24, 2015 is incorporated herein by reference in its entirety.

The following are definitions of exemplary terms used throughout the disclosure. Both singular and plural forms of all terms fall within each meaning:

"Logic," synonymous with "circuit" as used herein includes, but is not limited to, hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. In some instances, logic could also be fully embodied as software.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer", "processing unit", and "processor" as used herein includes, but is not limited to, any programmed or programmable electronic device that can store, retrieve, and process data.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Referring now to the drawings, FIG. 1 shows a block diagram and flow chart or program implemented by a standard onboard controller (e.g., microprocessor, microcontroller, computer, etc.) in electric arc welder 10. For example, welder 10 can be a Power Wave, inverter based electric arc welder sold by The Lincoln Electric Company of Cleveland, Ohio. In accordance with standard technology, welder 10 includes a three phase electrical input L1, L2, L3 directing electrical current to power supply 12. An onboard computerized controller operates the inverter based power supply to create a positive potential at terminal 14 and a negative potential at terminal 16.

Selected arc welding processes are performed by directing a selected previously determined wave shape to the actual welding circuit, shown to have a standard smoothing inductor 18. Welder 10 performs the electric arc welding process between an advancing welding wire 20 from reel 22 driven at a desired rate by feeder 24 operated at the speed of motor 26. Heat of the arc melts wire 20 and workpiece 30 to deposit molten metal from the wire onto the workpiece. To monitor the actual parameters of the welding process, shunt 32 provides output signal $I_a$ from block 34 on line 34a. This signal is representative of the actual arc current at any given time. In a like manner, the voltage between wire 20 and workpiece 30 is sensed by block 36 so the output $V_a$ on line 36a is the instantaneous arc voltage to constitute a second weld parameter. The weld parameters illustrated in FIG. 1 are the actual arc current $I_a$ and the actual arc voltage $V_a$.

Another parameter controlled for practicing the invention is wire feed speed (WFS), caused by rotation of the motor 26. Consequently, three externally readable welding parameters of the welding process are arc current $I_a$ in line 34a, arc voltage $V_a$ in line 36a and the wire feed speed WFS readable in line 46b, as explained later. The WFS in line 46b is read by tachometer or encoder 46c connected to the drive rolls 24 of the feeder gear box or, alternatively, on a passive wheel attached to the wire. In FIG. 1, the tachometer is shown as driven by the feed rolls. It could also be driven, for example, by the output shaft of motor 26.

The Power Wave electric arc welder includes a wave shape generator to create a series of rapidly repeating wave shapes, each wave shape (e.g., a single sequence of a voltage/current waveform) constituting a weld cycle with a cycle time. These weld cycles are repeated during the welding process to define a weld time. One embodiment of the Power Wave welder 10 is shown in U.S. Pat. No. 5,278,390 to Blankenship wherein the welder controls the individual wave shape to be output by power supply 12 through command line 42 and the speed of motor 26 through command line 44. Command line 44 has a signal which is recognized by the microprocessor on the wire drive control 46 of motor 26 to output the motor voltage drive PWM pulses in line 46a. In practice, the information on line 44 is digital and the command signal on line 46a is analog. Wave shape generator 40 creates digital signals in lines 42, 44 to controlling the desired welding process to be performed by welder 10. The external parameters $I_a$, $V_a$ and WFS can be read by appropriate monitoring devices.

The wave shape generator 40 divides or segments each of the output wave shapes into a series of time segmented portions or states. In one exemplary embodiment, monitor M is a program loaded into the computer of welder 10, among other things, to read parameters during one selected segment of the wave shape. The monitor M can be implemented using software, hardware, and combinations thereof, without departing from the spirit and the scope of the general inventive concepts. The portion of the wave shape being monitored is determined by the wave shape generator 40. Indeed, monitor M monitors various time segments or states of the wave shape output by generator 40. In practice, the wave shape generator 40 selects several of the time segments forming the wave shape and outputs the various states into a command interface 70. Consequently, the command interface 70 causes measurement of the parameters during selected time segments of each wave shape output by the generator. Information or data on the command interface 70 includes the state or states being monitored and the particular value or level of the various parameters $I_a$, $V_a$, and/or WFS.

Interface 70 of monitor M contains the data recognizing the particular state being processed together with the values for the weld parameters being read. The data in interface 70 is analyzed by level stage 81 to determine the relationship of a parameter on a level basis. The actual parameters are compared with trained or measured parameters during selected states of the wave shape from generator 40. During a particular segment or state of the wave shape, level monitor stage 81 reads the actual parameters in lines 34a, 36a and 46b. These instantaneous values of the actual parameters are stored in internal memory, identified as the report logic 82. The reading of the actual parameters occurs rapidly as indicated by oscillator 84. In one exemplary embodiment, reading of the actual parameters occurs at a rate of 120 kHz for pulse welding. The rate can be adjusted; however, the higher the rate the better the sensitivity of the level measurement. Level monitor 81 also determines a deviation of the actual welding parameters from either a minimum or maximum level. In this manner, not only can the actual values be stored, but data is stored representing deviation of the actual reading of the parameter for a given state as compared to a minimum level or to a maximum level. Report memory or logic 82 records deviation from a set level during a given state of the wave shape, as well as the actual level during the selected state of the wave shape. For a total weld cycle, these readings are accumulated, counted or otherwise processed to determine the quality of the weld and any trends toward weld defects.

In one exemplary embodiment, the readings (e.g., periodically accumulated sets of the readings) are weighted based on a plurality of criteria. The readings can be accumulated, for example, every 250 ms. In one exemplary embodiment, a set is weighted based on a magnitude of its deviation from an expected value (e.g., predetermined threshold, mean value) and a time contribution of its time segment to the corresponding wave shape. Such a weighting method (e.g., the weighting method 900 shown in FIG. 9 and described below) could be implemented, for example, in level monitor stage 81 or any similar or related data processing stage.

Stability monitor stage 91 reads the actual welding parameters on lines 34a, 36a and 46b at a rapid rate determined by oscillator 94. In one exemplary embodiment, reading of the actual parameters occurs at a rate of 120 kHz for pulse welding. Stability monitor stage 91 analyzes the actual weld parameters for standard deviation or absolute deviation during a state of the wave shapes being output. Report memory or logic 92 records this deviation during a given state of the wave shape, as well as the actual value during the selected state of the wave shape. For a total weld cycle, these readings are accumulated, counted or otherwise processed to determine the quality of the welding and any trends toward weld defects.

In one exemplary embodiment, the readings (e.g., periodically accumulated sets of the readings) are weighted based on a plurality of criteria. The readings can be accumulated, for example, every 250 ms. In one exemplary embodiment, a set is weighted based on a magnitude of its deviation from an expected value (e.g., predetermined threshold, mean value) and a time contribution of its time segment to the corresponding wave shape. Such a weighting method (e.g., the weighting method 900 shown in FIG. 9 and described below) could be implemented, for example, in stability monitor stage 91 or any similar or related data processing stage.

A few wave shapes can be skipped when using either monitor stage 81 or monitor stage 91. In one exemplary embodiment, after a start sequence, all of the wave shapes are monitored for analyzing the actual welding parameters during the various selected states of the wave shape. Several states of a given wave shape in a welding process are monitored and the results are recorded separately for each state to be analyzed for level conformity, trend and stability. When measuring stability, a standard deviation algorithm is used in monitor M to evaluate $I_a$, $V_a$ and/or WFS. This information is available to analyze each of the various segments of the wave shape forming a total weld cycle with a given cycle time. In practice, certain states, such as the peak current during a pulse wave shape are monitored to determine the stability and level deviations of the pulse welding process. In an STT welding process, monitor M records short circuit times for each wave shape, since these segments vary in time according to the external conditions of the welding process. Variation in short circuit time informs the welding engineer of adjustments to be implemented.

Figure 2:
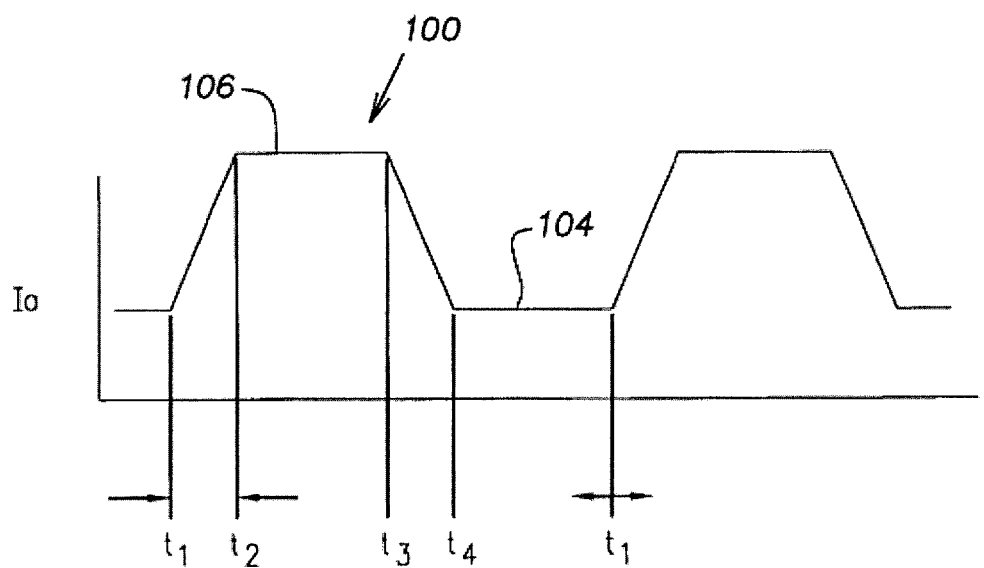
FIG. 2 is a current command graph from a wave shape generator showing the command wave shape divided into time segments or states of both fixed and variable durations, according to one exemplary embodiment.
Figure 3:
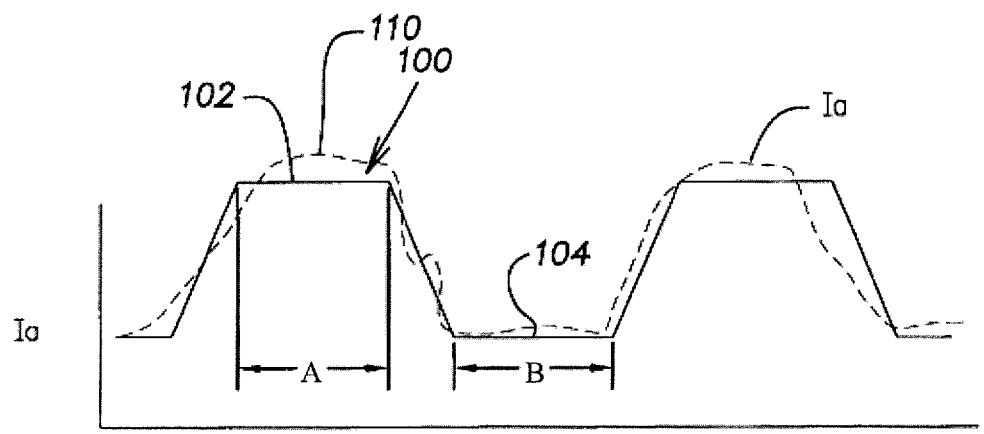
FIG. 3 is a current graph of the actual command signals for arc current with the actual arc current parameter superimposed in dashed lines, according to one exemplary embodiment.

The series of rapidly repeating wave shapes generated by the standard wave shape generator 40 are divided into time states, as shown in FIGS. 2 and 3. The output current command wave shape is pulse wave shape 100 with a peak current 102 having a fixed duration of time segment A shown in FIG. 3 and a background current 104 with a variable time duration for segment B shown in FIG. 3. The wave shape is divided into segments at times $t_1$-$t_4$ so that the command interface 70 receives the particular state being processed by generator 40 at any given time. As shown in FIG. 3 by the dashed line 110, the actual arc current from shunt 33 in FIG. 1 deviates from the command current signal of wave shape 100.

During the selected functional states, such as state A or state B, the actual arc current $I_a$ is read at a rate determined by oscillator 84 or oscillator 94. In practice, this is a single software oscillator. Level monitor stage 81 records deviation in the ordinate direction between the actual parameter 110 and the command level of wave shape 100. During the selected state, stability monitor stage 91 reads the statistical standard deviation of the actual parameter. States A and B are normally monitored for a pulse welding process. However, the ramp up state between $t_1$-$t_2$ and/or the ramp down state during $t_3$-$t_4$ can be monitored to control or at least read the activity of the actual parameter during these states of the wave shape. As illustrated, the background time segment B has a variable time, as shown by the variable time positions of time $t_1$. Consequently, the state being monitored can have a fixed time duration or a variable duration. When a variable duration, the state is monitored until the end of the duration. Report logic 82 senses this as a level from one time, i.e. $t_4$, to the successive time, i.e., $t_1$. As the time $t_1$ changes with respect to the time $t_4$, this time of each wave shape is recorded as a level which is compared to a known time, obtained from interface 70 by selection of the welding mode of generator 40.

Monitor M monitors the actual welding parameters during specific selected states of the wave shapes; however, the monitor also has programming to operate the computer to determine the stability and/or level characteristics of an internal signal, such as the actual input to motor 26 on line 46*a*. Such internal monitoring of the signal on line 46*a* is set forth in the flow chart shown in FIG. 4 utilizing the signals shown in FIG. 5.

The microprocessor in the wire feeder includes a subroutine that is a PID comparing network similar to an error amplifier. This PID comparator is schematically illustrated as block 152 in FIG. 4 having a first input 46*b* which is a wire feed speed WFS and a command signal on line 44. The actual WFS on line 46*b* is read by a tachometer or encoder connected to the drive rolls 24 of the feeder gear box or, alternatively, on a passive wheel attached to the wire to read the WFS. The output 156 of the PID is the voltage level at the input of the pulse width modulator 158 which is digitized in the microprocessor of the feeder. The output of the pulse width modulator is the command signal on line 46*a* to motor 26 for controlling the wire feed speed of feeder 24.

Figure 4:
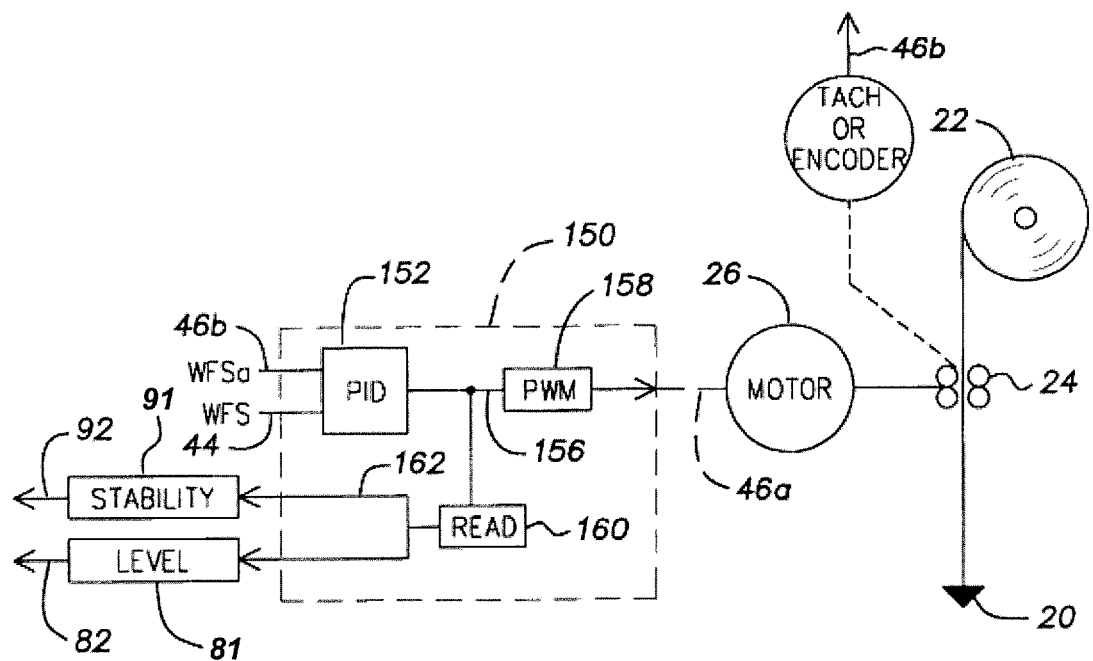
FIG. 4 is a block diagram for monitoring signals internal of the welder instead of weld parameters as illustrated in FIGS. 2 and 3, according to one exemplary embodiment.

In accordance with one exemplary embodiment, monitor M includes the process program as schematically illustrated in FIG. 4 wherein the signal on line 156 is read by processing block 160 and the results are output on line 162 to the input of the level monitor stage 81 and/or the stability monitor stage 91, as previously discussed with respect to the embodiment shown in FIG. 1. Consequently, an internal signal on line 156 is read at a rapid rate, exceeding 1 kHz, to check the level of this internal signal and/or the stability of this signal.

Figure 5:
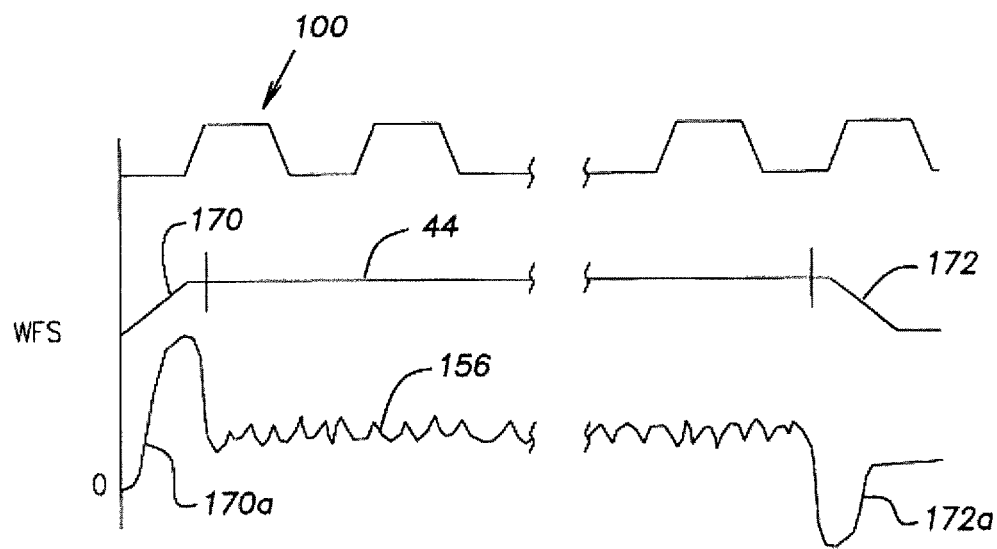
FIG. 5 is a time based graph illustrating the wave shape, wire feeder command signal and actual wire feeder command signal as experienced in the exemplary embodiment shown in FIG. 4.

As illustrated in FIG. 5, the wave shape 100 for pulse welding extends as a succession of wave shapes from generator 40. With respect to the wire feed speed, the command signal from generator 40 on line 44 takes the form shown in FIG. 5. It includes a start ramp up portion 170 and an ending ramp down portion 172. These two portions cause a drastic increase or decrease in the command signal on line 44. Between these abnormal command portions of the signal on line 44, there is a generally level wire feed speed command which is employed for the purposes of testing stability and/or the level deviation of this internal signal on line 156. In FIG. 5, the wire acceleration portion 170 is held until the speed is stabilized. This time is also monitored. Other internal signals can be monitored using the same concept as shown in FIGS. 4 and 5. The level monitor stage determines if the signal on line 156 exceeds the minimum or maximum for a prolonged time. For the wire feeder, this normally indicates a jam in the feeder system.

Figure 6:
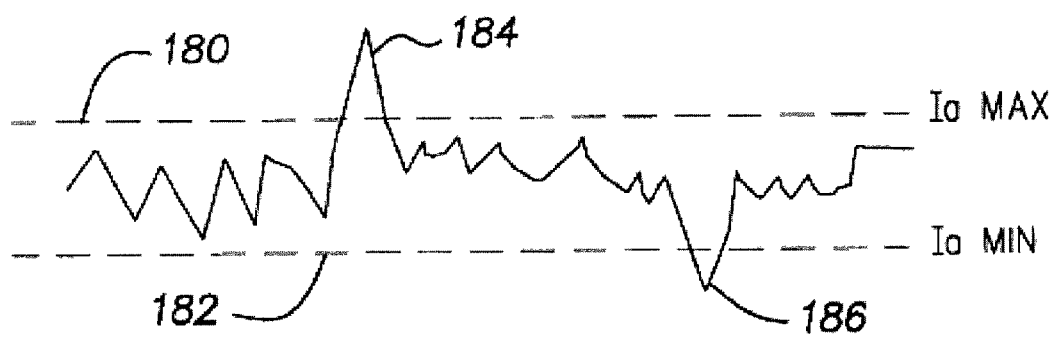
FIG. 6 is a portion of a parameter curve illustrating a level monitoring feature, according to one exemplary embodiment.

FIG. 6 shows the concept of a level monitor stage wherein threshold 180 is the maximum parameter level and threshold 182 is the minimum parameter level. When the parameter, illustrated as arc current, exceeds threshold 180 as indicated by transient 184, there is a recorded event of over current. In a like manner, when the current is less than the minimum level 182, as shown by transient 186, there is recorded an under current event. Additionally, these events can be weighted based on a plurality of criteria. In one exemplary embodiment, each event is weighted based on a magnitude of its deviation from an expected value (e.g., predetermined threshold, mean value) and a time contribution of its time segment to the corresponding wave shape. Such a weighting method (e.g., the weighting method 900 shown in FIG. 9 and described below) could be implemented, for example, in level monitor stage 81, stability monitor stage 91, or any similar or related data processing stage.

The weighted events are counted or otherwise accumulated periodically to provide the output of the level monitor stage 81 as shown in FIG. 1. The weighted events can be accumulated, for example, every 250 ms. Consequently, the level monitor stage 81 detects excursions 184 above a preset threshold and excursions 186 below a preset level. These levels are set by the particular state in the interface 70. Some states of a wave shape employ the level monitor stage 81 with thresholds and other states of the same wave shape may use the stability monitor stage 91. Preferably, and in practice, both monitor stages are used for the selected state or states of the wave shape being interrogated by monitor M.

Figure 7:
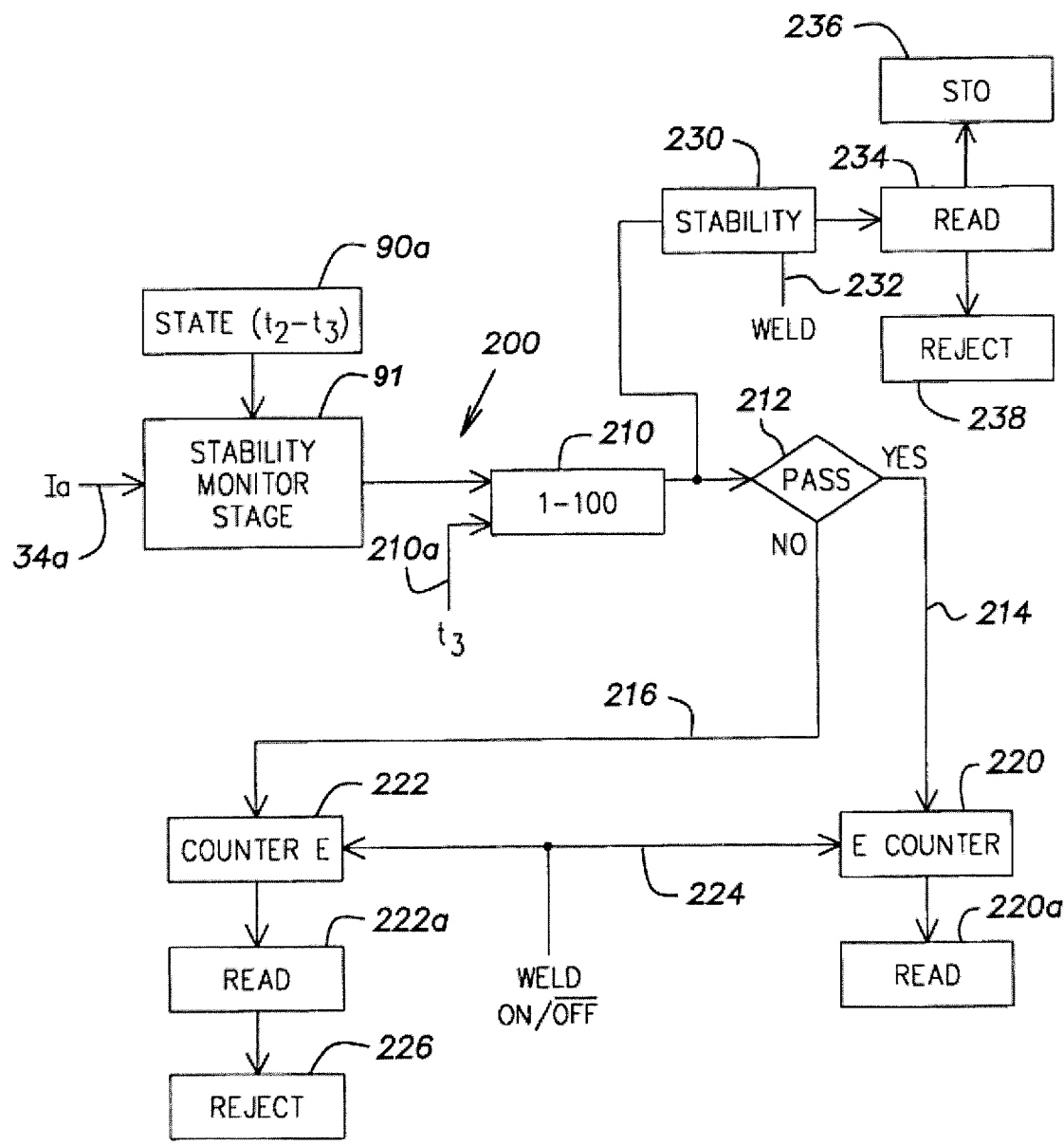
FIG. 7 is a block diagram and computer flow chart or program illustrating processing for stability during a selected state of the wave shape shown in FIGS. 2 and 3, according to one exemplary embodiment.

The embodiment shown in FIG. 1 monitors the level and/or stability of actual parameters for internal control signals during a selected state of the wave shape from generator 40 or during the total weld as explained in relationship to the disclosure in FIGS. 4 and 5. The monitor M in FIG. 1, as so far explained, provides weighted data for use in analyzing the weld cycle or the total operation of the welder over a work period of time. Various analysis programs are used to process data after the data has been determined and stored. In accordance with one exemplary embodiment, the weighted stability data from monitor stage 91 is analyzed by two programs as shown in FIG. 7. It is within the skill of the art to analyze the stability data in a variety of computer programs for recording, display and process intervention or evaluation.

As shown in FIG. 7, analysis program 200 uses the results of monitor stage 91 of monitor M (i.e., the weighted stability values). As an example, the program 200 is operated during monitoring of the time state between times $t_2$-$t_3$, which is the current peak portion of the wave shape as shown in FIGS. 2 and 3. Analysis program 200 is shown as a computer flow chart showing two systems employed to analyze the results of the stability stage 91 during the peak current state where the statistical standard deviation of actual current in line 34a is calculated. In practice, there is a slight delay before the monitor stage 91 makes calculated deviations. The sample select feature to read $I_a$ during state $t_2$-$t_3$ but ignore $I_a$ otherwise is illustrated as sample selector or filter 90a. This program delay at the start of time segment $t_2$-$t_3$ incorporated in filter 90a allows the monitor to ignore fluctuations in the current which are experienced during each level shift in the various stages of the output wave shape.

In the programmed flow chart shown in FIG. 7, the stability output from monitor stage 91 is read by the computer program shown as block 210 which is reset as indicated by the logic on line 210a at the end of each wave shape determined by the existence of time $t_3$. Consequently, the stability of each wave shape is captured by block 210. This captured stability data is processed in accordance with two separate analysis programs.

The first program includes the pass analysis routine 212. If the stability for a given wave shape passes the desired threshold set in block 212, this information is output on line 214. If the particular wave shape has a stability less than a desired threshold, a logic signal appears in line 216. Counters 220, 222 are enabled by the logic on line 224 during each of the weld cycles. Consequently, the stability pass signals for each of the wave shapes during the weld cycle are counted in either counter 220 or counter 222. Of course, the first portion of each state $t_2$-$t_3$ is ignored to allow the parameter $I_a$ to settle. The results of the two counters are read, stored or otherwise retained as indicated by the read block 220a, 222a, respectively. In one exemplary embodiment, if the instability accumulated by counter stage 222 is beyond a desired number, the weld cycle is rejected as indicated by block 226.

A second analysis implementation of computer program 200 shown in FIG. 7 is illustrated as block 230. This is a program enabled during the weld cycle. The total instability of the weld cycle accumulating during all wave shapes is analyzed as a total number wherein 100 is the most stable arc. The output of this stability accumulator and analyzing stage is read, stored or otherwise retained as indicated by block 236. If the reading stage 234 is below a set stability then the weld cycle is rejected as indicated by block 238. A person skilled in the art can design other programs for analyzing the results of the monitor M from stability stage 91. The computer program 200 exhibits two implementations to analyze the obtained weighted stability data. The two implementations can be selectively enabled (either one or the other or both) depending on the nature of the arc stability or weld quality problem the monitor is configured to detect. It is advantageous to read stability in only selected states of the wave shapes, because stability over a variable pulse is not obtainable.

Figure 8:
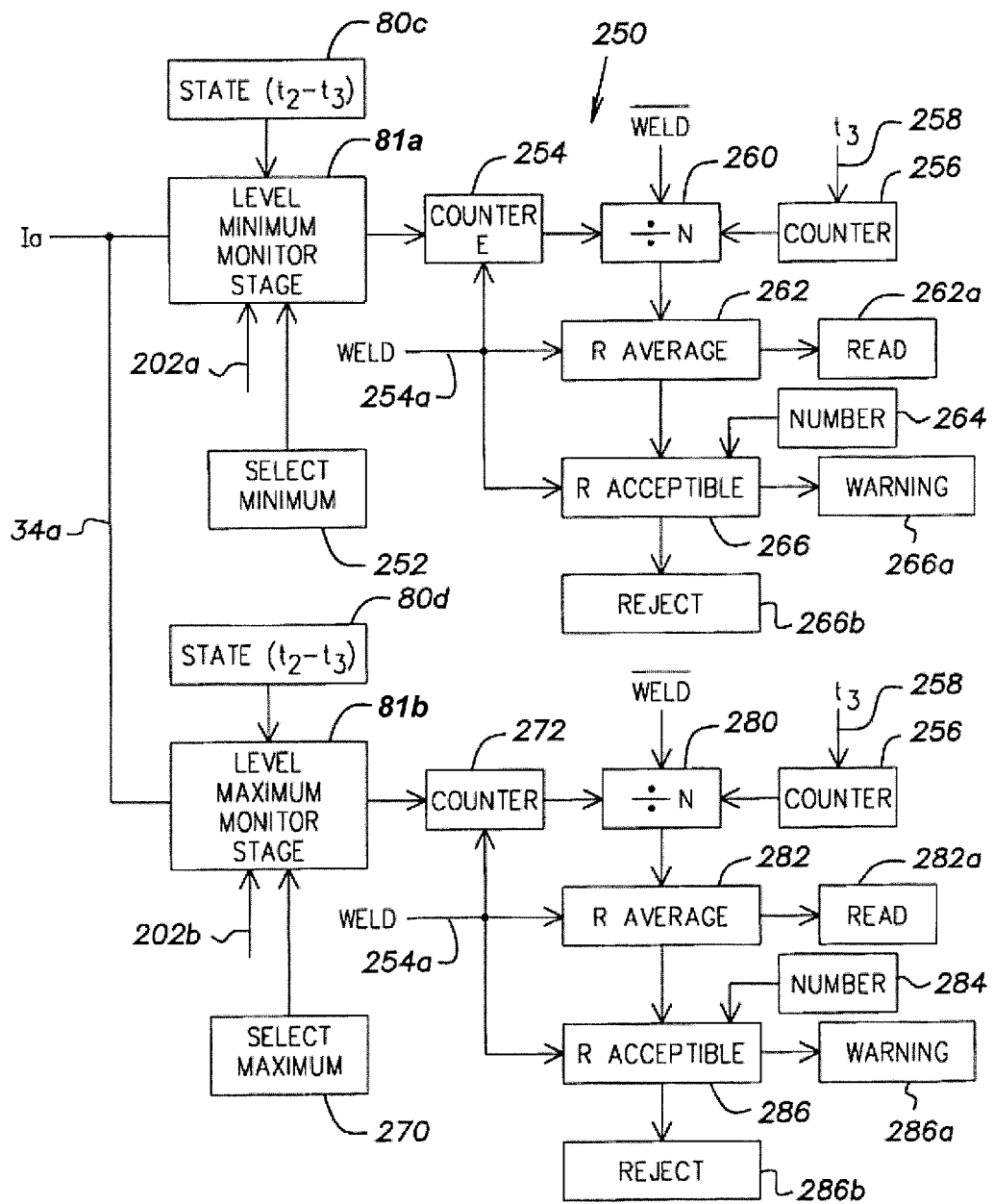
FIG. 8 is a block diagram and computer flow chart or program to process information from the level monitor stages of the exemplary embodiment shown in FIG.

In accordance with another exemplary embodiment, the computer program for analyzing the results of level monitor stage 81 of monitor M (i.e., the weighted read values) is shown in FIG. 8. In this illustrated embodiment, level analysis program 250 processes the output from monitor level stage 81 in two separate routines, identified as a minimum monitor stage 81a with filter 80c and a maximum monitor stage 81b with filter 80d. Either one of these stages can be used separately or, in practice, they are combined. Subsection 81a relates to the determination of transitions 186 shown in FIG. 6 which is an event where the actual parameter is below the threshold minimum 182. The minimum level on line 202a from generator 40 is used when stage 81a is selected by program step 252. These events are counted by block 254 for each of the weld cycles as indicated. The counter is enabled during the weld cycle by the logic on line 254a. Counter 254 is a running total of the wave shapes used in a weld cycle. The number of wave shapes is obtained by counting the occurrences of time $t_3$ from the output of generator 40 as indicated by line 258. As indicated before, the first part of the state is generally ignored to remove normal inconsistencies at the start of any particular state. Block 260 is the computer flow chart subroutine for dividing the accumulated minimum events 186 from monitor stage 81a divided by the number N from the counter 256. This provides an average of minimum transitions during the weld cycle, which is provided to subroutine 262. The average minimum transitions are read, stored or otherwise output as indicated by block 262a. If the average is above a certain threshold number provided by the wave generator or by the program step 264, program routine 266 determines that the weld cycle is unacceptable. If acceptable, no action is taken. However, if the acceptable routine 266 determines that the average is merely approaching the number 264, a warning signal is provided by block 266a. Total unacceptability provides a weld reject signal by routine 266b. A person skilled in the art can devise other computer programs for effecting the analysis of the minimum current deviation or transition of the actual parameter as it relates to a set threshold.

In FIG. 8, the maximum monitor stage 81b operates in conjunction with the minimum stage 81a. The maximum level is on line 202b from generator 40 and is used when stage 81b is selected by program 270. Like data information and programming retains the same numbers. Counter 272 counts the number of events 184 during the state $t_2$-$t_3$. Subroutine 280 provides the average of events 184 during the various wave shapes formed during the weld cycle. This average in block 282 is read, stored or otherwise used as indicated by block 282a. In block 286, the acceptability subroutine is processed wherein the number indicated by block 284 output from generator 40 or otherwise implemented by computer program is compared with the average from block 282 to provide a warning signal as indicated by block 286a when the average approaches the set number indicated by block 284. If the number is reached, a reject subroutine is implemented as indicated by block 286b.

In practice, stage 81a and stage 81b are implemented together and the average of both transitions from blocks 262 and 282 are analyzed by a read, acceptable number to give a warning and/or a rejection of a given weld cycle. Consequently, in practice, minimum level deviations are analyzed, maximum level deviations are analyzed, and total level deviations are analyzed. All of this is accomplished by the computer program as schematically illustrated in FIG. 8. The level stages 81a, 81b output level conditions which are stored and/or displayed as discussed with report logic 82. The level conditions output by the level stages 81a, 81b can be weighted, as discussed herein.

In view of the above, the use of the magnitude and time contribution weights provide a more accurate measure of parameter stability and, thus, overall weld quality. In this manner, an easy to understand numerical value or score can be computed to quantify the overall quality of a weld. In one exemplary embodiment, a weld score between 0-100 or 0%-100% is calculated for a weld based on monitored welding conditions or parameters, such as those monitored by the exemplary embodiment shown in FIG. 1. Such a weighting method (e.g., the weighting method 900 shown in FIG. 9 and described below) could be implemented, for example, in level monitor stage 81, stability monitor stage 91, or any similar or related data processing stage.

Figure 9:
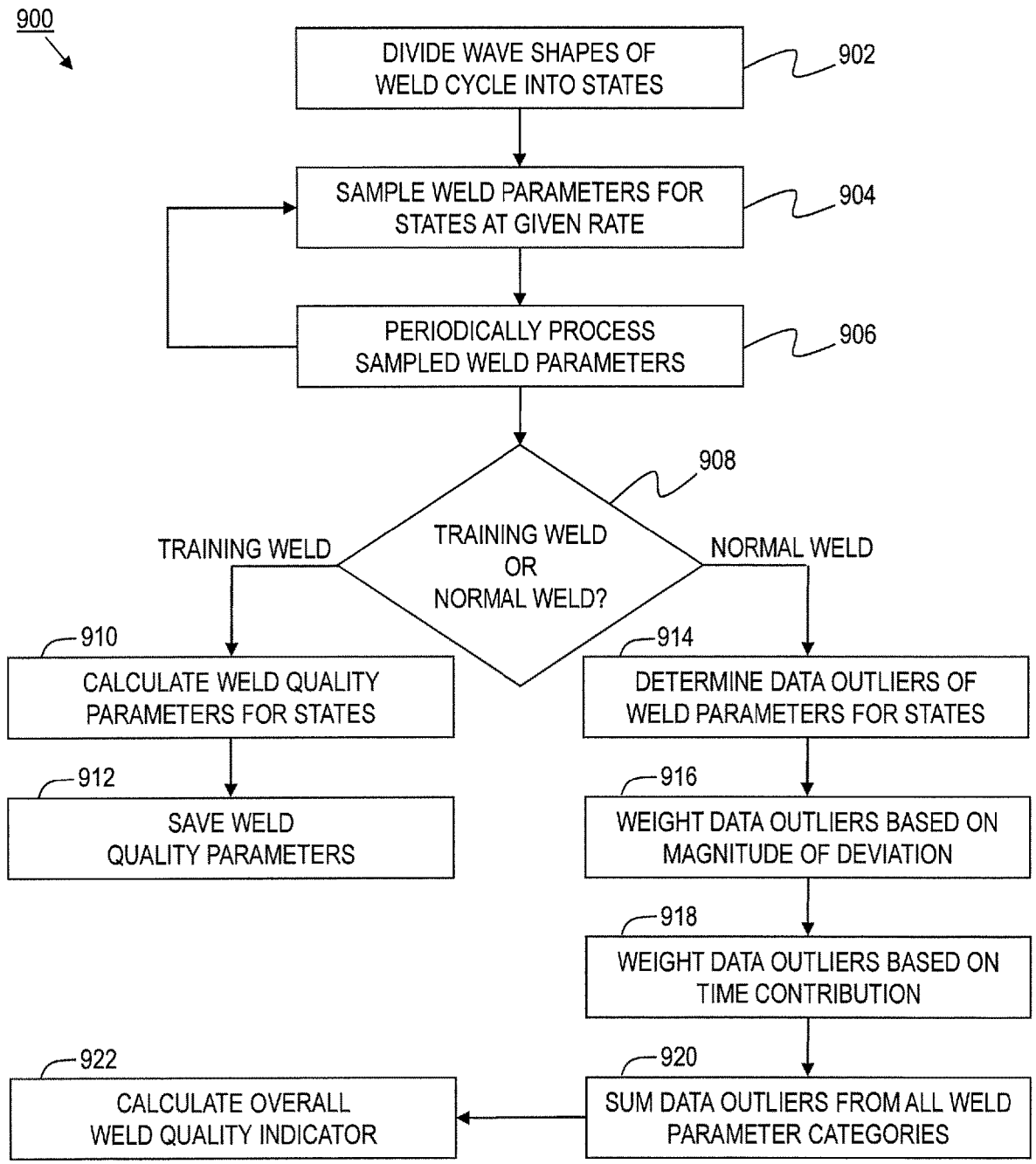
FIG. 9 is a flowchart illustrating a weighting method for weighting sampled weld data parameters, according to one exemplary embodiment.

A weighting method 900, according to one exemplary embodiment, is shown in FIG. 9. The weighting method can be implemented, for example, in the monitor M. In an initial step 902 of the weighting method 900, waves shapes of a weld cycle are divided into a series of time segmented portions or states. Then, in step 904, weld parameters (e.g., voltage, amperage) corresponding to at least one of the states are sampled at a given rate. In one exemplary embodiment, the sampling rate is 120 kHz. In one exemplary embodiment, the sampling rate is greater than or equal to 120 kHz. In one exemplary embodiment, the sampling rate can be used to generate an interrupt for interrupt service routine (ISR) processing.

The sampled weld parameters are used to calculate weld data. In the exemplary weighting method 900, the weld data include an execution count, a voltage sum, a voltage squared sum, an amperage sum, and an amperage squared sum. The execution count starts at zero and gets incremented by one for each sampling period (e.g., every 120 kHz). The voltage sum and the amperage sum start at zero and get increased by the sampled voltage and the sampled amperage, respectively, at each sampling period. Similarly, the voltage squared sum and the amperage squared sum start at zero and get increased by the square of the sampled voltage and the square of the sampled amperage, respectively, at each sampling period.

After a predefined sampling period, in step 906, the sampled weld data is passed on for further processing (as described below), the weld data values are reset to zero, and the sampling process (i.e., step 904) is repeated. In one exemplary embodiment, the sampling period is 250 ms. Each collection of sampled weld data forms an analysis packet. After further processing of the analysis packet (e.g., every 250 ms), additional weld data is available representing a current weld quality rating for the corresponding state. This additional weld data could be graphed and/or averaged. The average of these ratings over the length of the weld (i.e., the weld cycle) provides an overall quality indicator for the weld.

The further processing of the weld data of each analysis packet that occurs in step 906, for each of the sampled states, results in the calculation of additional weld data. The additional weld data include an execution count, a voltage average, a voltage root mean square (RMS), a voltage variance, an amperage average, an amperage RMS, and an amperage variance. The value of the execution count of the additional weld data is copied from the value of the execution count of the weld data. The voltage average is calculated as the voltage sum (from the weld data) divided by the execution count. The voltage RMS is calculated as the square root of the quotient obtained by dividing the voltage squared sum (from the weld data) by the execution count. The voltage variance is calculated as the voltage RMS minus the voltage average. The amperage average is calculated as the amperage sum (from the weld data) divided by the execution count. The amperage RMS is calculated as the square root of the quotient obtained by dividing the amperage squared sum (from the weld data) by the execution count. The amperage variance is calculated as the amperage RMS minus the amperage average.

After step 906, subsequent processing depends on whether the current weld is a training weld to be used in determining weld quality parameters or a normal weld to be evaluated against such weld quality parameters. Thus, in step 908, it is determined whether the current weld is a training weld or a normal weld. In one exemplary embodiment, the default condition is that a weld is a normal weld unless otherwise indicated (e.g., by user input).

If the current weld is determined in step 908 to be a training weld, the following additional weld data values are saved for a significant portion of the training weld (e.g., 20-30 seconds): the execution count, the voltage average, the voltage variance, the amperage average, and the amperage variance, whereas the other weld data values and additional weld data values can be disregarded. The significant portion of the training weld is the training period. In one exemplary embodiment, the training period corresponds to at least 80 consecutive analysis packets (i.e., sampling periods).

Thereafter, in step 910, weld quality parameters are calculated using the additional weld data values saved during the training period. For example, the following weld quality parameters are calculated for each of the sampled states: a quality execution count average, a quality execution count standard deviation, a quality voltage average, a quality voltage standard deviation, a quality amperage average, a quality amperage standard deviation, a quality voltage variance average, a quality voltage variance standard deviation, a quality amperage variance average, and a quality amperage variance standard deviation.

The quality execution count average is calculated as the average of the execution counts from all of the analysis packets processed during the training period. The execution counts could be rounded to integers. The quality execution count standard deviation is calculated as the standard deviation of the execution count from each analysis packet processed during the training period relative to the quality execution count average. The quality voltage average is calculated as the average of the voltage averages from all of the analysis packets processed during the training period. The quality voltage standard deviation is calculated as the standard deviation of the voltage average from each analysis packet processed during the training period relative to the quality voltage average. The quality amperage average is calculated as the average of the amperage averages from all of the analysis packets processed during the training period. The quality amperage standard deviation is calculated as the standard deviation of the amperage average from each analysis packet processed during the training period relative to the quality amperage average. The quality voltage variance average is calculated as the average of the voltage variances from all of the analysis packets processed during the training period. The quality voltage variance standard deviation is calculated as the standard deviation of the voltage variance from each analysis packet processed during the training period relative to the quality voltage variance. The quality amperage variance average is calculated as the average of the amperage variances from all of the analysis packets processed during the training period. The quality amperage variance standard deviation is calculated as the standard deviation of the amperage variance from each analysis packet processed during the training period relative to the quality amperage variance. As noted above, these quality parameters, when based on delivery of a confirmed good or otherwise acceptable weld, can be used as benchmarks to measure or otherwise rate subsequent welds.

If the current weld is determined in step 908 to be an evaluation weld (i.e., a weld requiring evaluation of its quality), as opposed to a training weld, none of the weld data or additional weld data need be saved. Instead, the results of various quality calculations are obtained and saved. These quality calculations include initially detecting, in step 914, the presence of various outliers. An outlier is a data point or value that is more than a threshold distance from a mean value to which the data point or value contributes. In one exemplary embodiment, an outlier is a value that falls outside the limit of three standard deviations from the mean value.

In the weighting method 900, the outliers sought in step 914 include execution outliers, voltage outliers, voltage variance outliers, amperage outliers, and amperage variance outliers. For each of the monitored states, each of the analysis packets are evaluated to detect the presence of any of these outliers.

If an analysis packet satisfies the following relationship, it is considered an execution outlier: absolute value of (execution count−quality execution count average)>(3× quality execution count standard deviation). If an analysis packet satisfies the following relationship, it is considered a voltage outlier: absolute value of (voltage average−quality voltage average)>(3× quality voltage standard deviation). If an analysis packet satisfies the following relationship, it is considered a voltage variance outlier: absolute value of (voltage variance−quality voltage variance average)>(3× quality voltage variance standard deviation). If an analysis packet satisfies the following relationship, it is considered an amperage outlier: absolute value of (amperage average−quality amperage average)>(3× quality amperage standard deviation). If an analysis packet satisfies the following relationship, it is considered an amperage variance outlier: absolute value of (amperage variance−quality amperage variance average)>(3× quality amperage variance standard deviation).

After detection of these outliers, a two-step weighted sum (i.e., from steps 916 and 918) of each outlier is used in calculating a quality indicator for the corresponding analysis packets.

The first step (i.e., step 916) in weighting each of the outliers is determined by the magnitude of the outlier relative to a three standard deviation limit. In general, approximately 0.3% of the data points or values could fall outside the limit of three standard deviations and, thus, be considered an outlier. The weighting of the outlier increases as its value increases above the limit of three standard deviations. The outlier is weighted at a full 100% at four standard deviations and is weighted at a maximum of 200% at five standard deviations. In general, the probability of a fully (i.e., 100%) weighted outlier occurring in a normal data set is 1 in 15,787.

Thus, in step 916, each of the outliers is weighted in accordance with this approach. The weight to be applied to each execution outlier is calculated as the absolute value of (amount above three standard deviation limit/quality execution count standard deviation), with a maximum weight value being 2.0. The weight to be applied to each voltage outlier is calculated as the absolute value of (amount above three standard deviation limit/quality voltage standard deviation), with a maximum weight value being 2.0. The weight to be applied to each voltage variance outlier is calculated as the absolute value of (amount above three standard deviation limit/quality voltage variance standard deviation), with a maximum weight value being 2.0. The weight to be applied to each amperage outlier is calculated as the absolute value of (amount above three standard deviation limit/quality amperage standard deviation), with a maximum weight value being 2.0. The weight to be applied to each amperage variance outlier is calculated as the absolute value of (amount above three standard deviation limit/quality amperage variance standard deviation), with a maximum weight value being 2.0.

The second step (i.e., step 918) in weighting each of the outliers is determined by the execution count of the outlier's state. In particular, the value of each outlier is multiplied by the execution count of the outlier's state, thereby accounting for the time contribution of the state relative to the overall wave shape. In this manner, states that have larger execution counts (i.e., execution times) produce outliers with correspondingly heavier weighting. Consequently, as the execution time for a particular outlier increases, the weight of the outlier will also increase.

The weighting of the outliers, in steps 916 and 918, produce a set of final weighted outliers including final weighted execution outliers, final weighted voltage outliers, final weighted voltage variance outliers, final weighted amperage outliers, and final weighted amperage variance outliers. These final weighted outliers are summed in step 920 to produce a final weighted outlier sum for each analysis packet. Thereafter, determination of a quality indicator for each of the analysis packets is calculated, in step 922, as the quotient obtained by dividing a perfect quality value minus the final weighted outlier sum by the perfect quality value. The perfect quality value is equal to the execution count for the analysis packet multiplied by the number of outlier categories (i.e., in this case five).

Thus, an instantaneous quality indicator (i.e., weld score or weld quality score from the current completed analysis packet) can be determined during the welding process and communicated to the welder or otherwise utilized. In this manner, potential problems can be detected as they occur, i.e., during the welding process, as opposed to only after the weld is complete, when it is likely too late to take any corrective action.

Furthermore, the average of the quality indicators aggregated up to any point of time during the welding process can be averaged to determine a quality indicator (e.g., weld score or weld quality score) of the weld up to that point of time. For example, after the welding process is complete, all of the individual quality indicators can be averaged to obtain an overall quality indicator, score, grade, rating or the like for the completed weld. The overall quality indicator for the weld can be compared against a predetermined quality indicator (e.g., derived from a training weld) that reflects the minimum quality indicator value for an acceptable weld.

In this manner, a quality of a weld can be determined accurately, efficiently, consistently, and/or automatically, in real-time or near real-time. This is particularly advantageous since visible inspection of a weld is not always sufficient to gauge its quality and since an operator might not detect or otherwise appreciate deviations or other problems during the welding process that can affect overall weld quality.

In some exemplary embodiments, a quality indicator (i.e., a weld score or weld quality score) for a weld is an effective tool for evaluating welds being repetitively produced under substantially the same conditions and according to substantially the same arc welding process, such as during an automated (e.g., robotic) welding process. By calculating instantaneous, periodic, and/or overall weld scores for each weld, an automated quality control process can be adapted for the arc welding process. In particular, a minimum acceptable weld score or range of acceptable weld scores is initially identified as a threshold, according to the weld conditions and the arc welding process. Thereafter, each weld has its (instantaneous, periodic, and/or overall) weld score compared against the threshold to quickly and accurately determine whether the weld should be accepted or rejected. Additionally, by evaluating trends across the weld scores for a production run or set of runs, problems in the production process can be more readily identified, and/or the production process can be more readily optimized. The quality indicators or weld scores discussed above are based on weighted, statistical measurements that reflect quality. The weld scores can be evaluated over time to determine whether any trend in moving away from an acceptable weld score (e.g., as evidenced by a continuing reduction in weld score) is present.

During a welding process, such as a robotic welding process, a weld score is periodically calculated (based on one or more sampled or otherwise measured parameters), to reflect a current status of the weld. The weld score can be calculated as an instantaneous measurement reflecting the current status of the weld or as an average of several measurements reflecting the status of the weld over a period of time (corresponding to the measurements) during the welding process. In one exemplary embodiment, the weld score is calculated by averaging all of the measurements taken since the welding process started, which reflects a current overall status of the weld. The weld score can be compared to a predetermined threshold weld score. The threshold weld score is a minimum weld score for a good or otherwise acceptable weld status. If the weld score is greater than or equal to the threshold weld score, the current status of the weld is determined to be good. Otherwise, the current status of the weld is determined to be bad.

Figure 10:
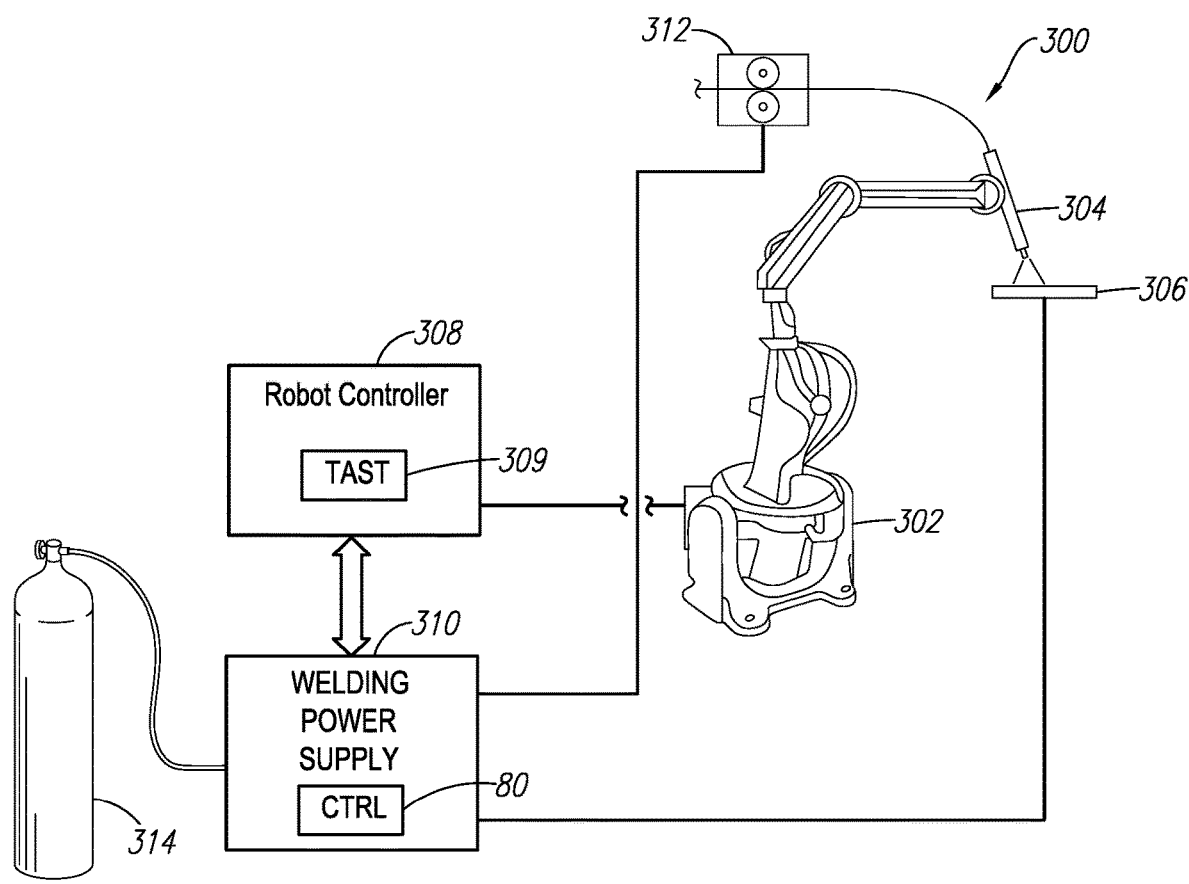
FIG. 10 is a schematic diagram of a robotic welding system.

FIG. 10 illustrates a schematic diagram of a robotic welding system 300. The robotic welding system 300 includes a welding robot 302 (e.g., a 6-axis robotic arm) that manipulates a welding torch 304 to perform arc welding on a workpiece 306. The arc welding can be gas metal arc welding (GMAW), flux-cored arc welding (FCAW), gas tungsten arc welding (GTAW), submerged arc welding (SAW), etc. The welding robot 302 receives positioning commands from a robot controller 308 to control the movements of the robot during welding. In certain embodiments, the robot controller 308 can include through arc seam tracking logic 309 for making corrections to the weld path. Through arc seam tracking is discussed in further detail below. The robot controller 308 communicates with a welding power supply 310 to exchange information during welding. Such exchanged information can include welding parameters, such as welding voltage and current, welding state information, and torch position information. The welding power supply 310 includes a processor-based controller 80 for controlling welding parameters, such as a welding waveform, welding voltage, welding current, wire feed speed, etc. The robotic welding system can include a wire feeder 312 for feeding a consumable welding electrode to the welding torch 304, and can include a supply of shielding gas 314 that is delivered to the welding torch 304.

Figure 11:
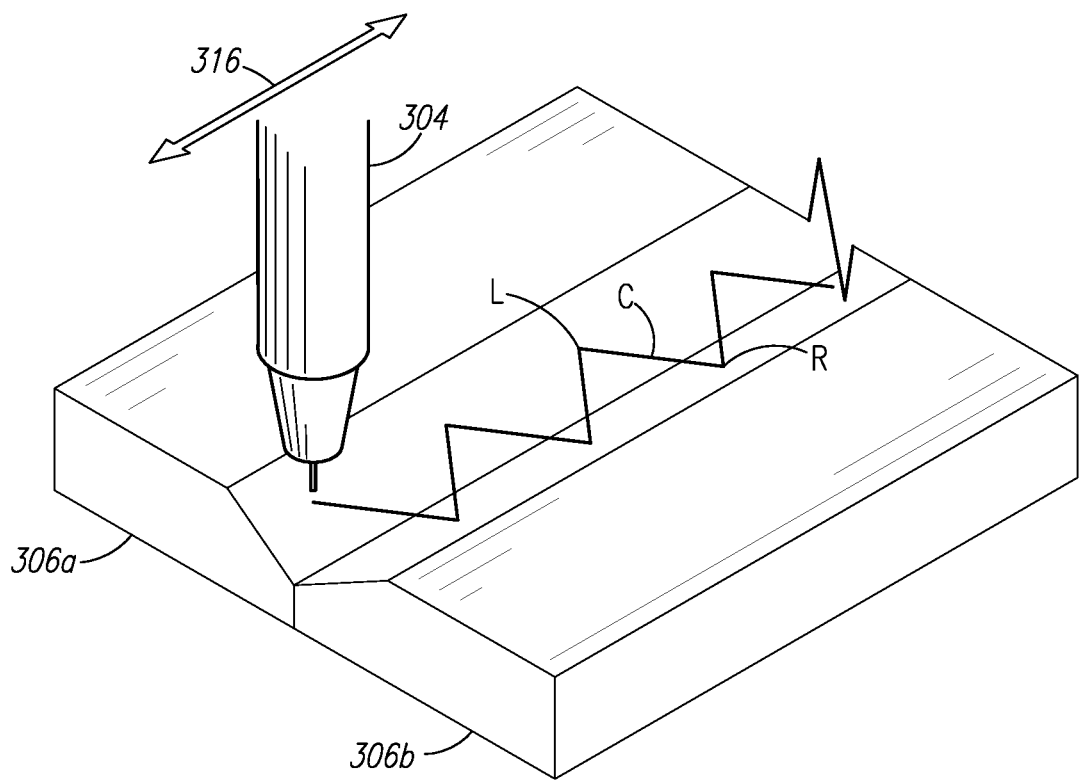
FIG. 11 shows a weave welding pattern.

FIG. 11 shows an example weave pattern that can be performed by the robotic welding system when welding a first workpiece 306a to a second workpiece 306b. As the robot moves the welding torch 304 in a direction 316 along the weld seam during welding, it weaves the torch right and left across the weld joint. Right R, left L, and center C weave positions are indicated in FIG. 11. The robot can weave the welding torch 304 back and forth across the seam at a generally constant frequency, which may depend on such variables as the travel speed of the welding torch 304 in the direction 316 of the seam, and the wire feed speed of the welding electrode. Example weave frequencies are in the range of 1-5 Hz, although other weave frequencies are possible.

When calculating quality indicators (e.g. weld scores or weld quality scores) for a weave welding process, the accuracy of the weld scores can be improved by making the calculations at consistent positions (e.g., L, R, and/or C) along the weave pattern. This can allow the analysis packets that are used to calculate weld scores to contain similar data (e.g., data across one weave period). The robot controller can provide torch position information and/or information about the weaving speed (e.g., weave frequency or period) to the welding power supply, so that the welding power supply can make weld score calculations at consistent positions along the weave pattern. For example, the robot controller inform the welding power supply of the position of the torch within the weave pattern, and the welding power supply can calculate a weld score based on the position of the torch. Every time the welding torch reaches the left position L of the weave pattern (or some other predetermined position), the welding power supply can process an analysis packet as described above to calculate a weld score for one period of the weave. In such a scenario, instead of having a predetermined or fixed duration sampling period over which an analysis packet is collected, the sampling period is determined by the weave period or frequency, according to the torch position information provided to the welding power supply by the robot controller. Thus, the welding power supply can use the torch position information as synchronizing information for calculating weld scores. The robot controller can also inform the welding power supply of the weave frequency or weave period, and the welding power supply can adjust the sampling period for the analysis packet based on the weave frequency/period. For example, the welding power supply could set the sampling period for the analysis packet to equal the weave period. For a 2 Hz weave frequency, the weave period is 500 ms, and the sampling period for the weld score analysis packet could be set or adjusted to 500 ms by the welding power supply (thereby allowing the welding power supply to calculate a weld score at consistent positions along the weave pattern). With the sampling period for the weld score analysis packet set to the weave period, the welding power supply can also refer to torch position information provided by the robot controller to automatically adjust the sampling period if needed, to obtain weld scores at consistent weave positions. If through arc seam tracking (TAST) is being performed by the robot controller to automatically follow directional changes to the welding seam, TAST information can be used by the welding power supply to enhance the weld score. For example, deviations in the weld seam can be recorded along with the weld score, or be used in a weighting process when calculating the weld score. The TAST information recorded along with a weld score would correspond to that weld score.

Figure 12:
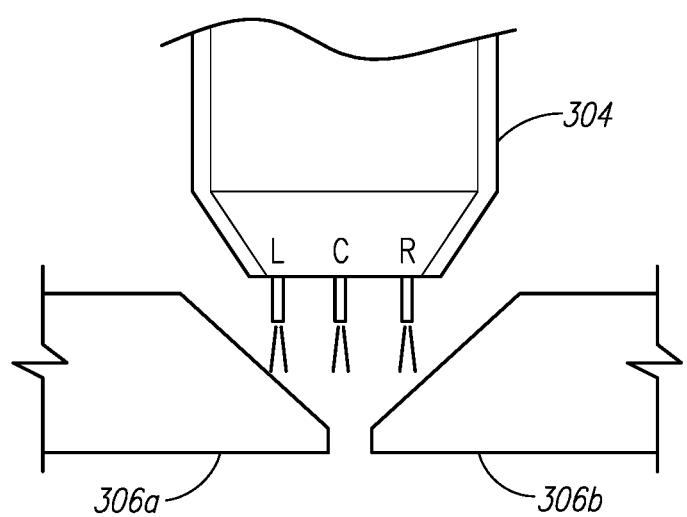
FIG. 12 shows measurement locations for through arc seam tracking.

FIG. 12 illustrates TAST during weave welding. TAST uses welding current and voltage feedback and the weave function of the robot to determine the lateral position of the torch in the weld joint. At the center of the joint, arc current is at a minimum and arc length or voltage is at its maximum. As the torch reaches the edge of its weave cycle (L and R positions), arc current peaks and voltage drops. If the value of the peak current at the edge of the weave cycle increases, the torch is moving away from the weld joint, and TAST makes the necessary corrections to the robot's weld path to follow the welding seam. TAST can also determine the vertical position of the torch. As contact tip to work distance increases, current gets smaller, and as the contact tip to work distance shortens, the amount of current increases. TAST can correct variations in the torch's vertical position to maintain a constant stick-out. TAST calculations can utilize both welding voltage and current to determine the edges of the weld seam (e.g., TAST can calculate impedance or impedance changes from the voltage and current measurements). FIG. 12 illustrates left L, center C, and right R weave positions for performing TAST calculations.

Figure 13:
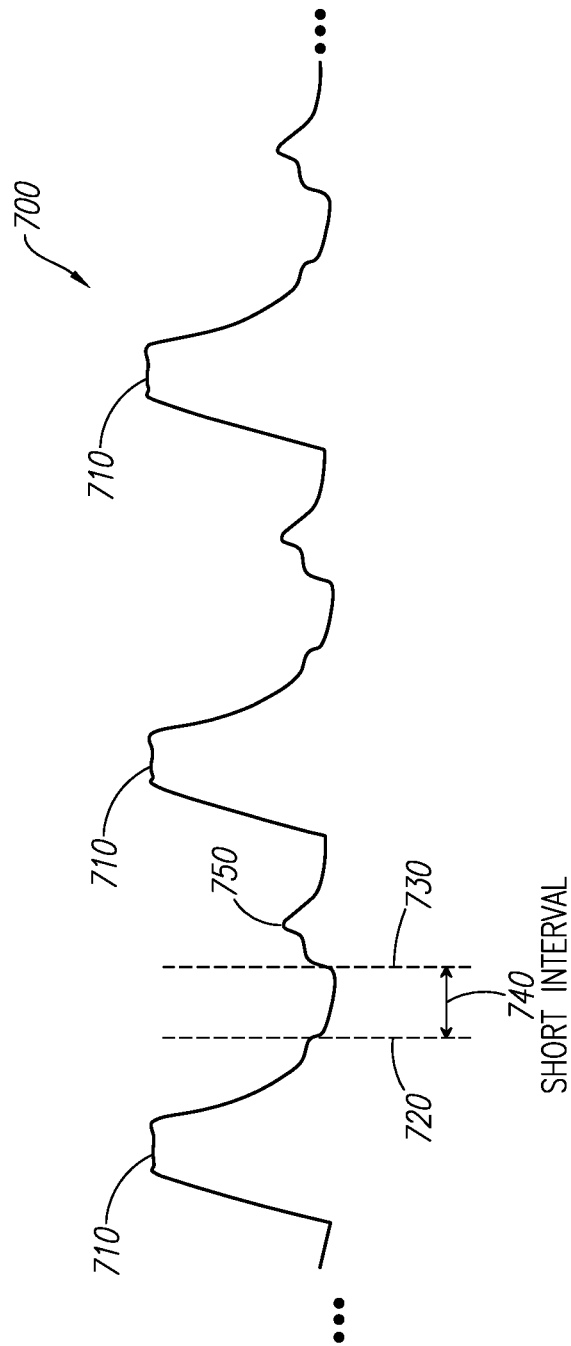
FIG. 13 illustrates an example pulsed output current welding waveform.

FIG. 13 illustrates an example pulsed output current welding waveform that can be used during weave welding and when performing TAST calculations. The waveform in FIG. 13 is merely exemplary and provided for ease of explanation. It is to be appreciated that many different welding waveforms (e.g., surface tension transfer STT) would be applicable to the present disclosure. The waveform 700 in FIG. 13 includes a peak pulse 710. After a peak pulse 710 is fired, a short may occur starting at time 720, for example, that lasts until time 730, for example, when the short is cleared. The times 720 and 730 define a short interval 740. Peak pulses 710 are fired at regular intervals during the multiple pulse periods or cycles of the welding process. The waveform 700 also includes a plasma boost pulse 750, which is used to help prevent another short from occurring immediately after a short that was just cleared. An example frequency range for the waveform 700 is 100-200 Hz, although other frequencies are possible.

Figure 14:
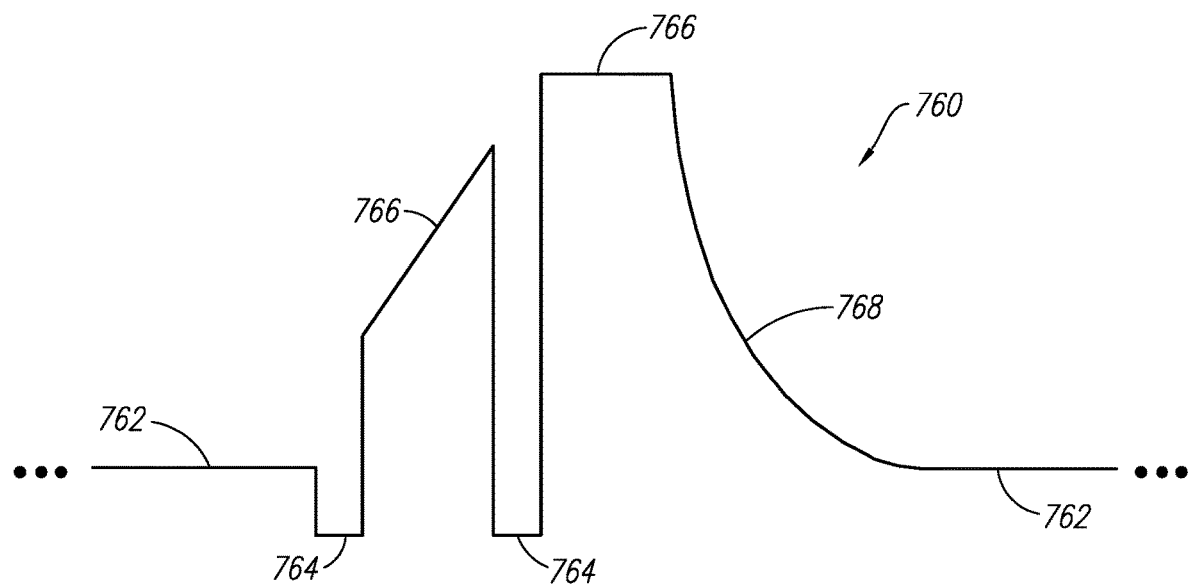
FIG. 14 illustrates and example pulsed output current welding waveform.

FIG. 14 illustrates a further example pulsed output current welding waveform that can be used during weave welding and when performing TAST calculations. The waveform 760 in FIG. 14 is an STT welding waveform. A background current 762 (e.g., between 50 and 100 amps) maintains the arc and contributes to base metal heating. After the welding electrode initially shorts to the weld pool, the current is quickly reduced to a minimum level 764 to ensure a solid short. An upwardly-ramping pinch current is then applied to squeeze molten metal down on the end of the electrode into the weld pool, while monitoring the necking of the liquid bridge portion of the electrode. When the liquid bridge is about to break, the welding power supply reacts by reducing the welding current to the minimum level. Immediately following the arc re-establishment, a peak current 766 or plasma boost pulse is applied to produce plasma force pushing down the weld pool to prevent an accidental short between the electrode and weld pool, and to heat the weld puddle and the joint. Then an exponential tail-out 768 is adjusted to regulate overall heat input. The tail-out 768 returns the welding current to the background current 762 level. An example frequency range for the STT waveform is 100-200 Hz, although other frequencies are possible.

In conventional TAST, the robot controller, which may include a dedicated TAST controller (e.g., a TAST control board or TAST logic), monitors welding current and voltage with respect to torch position in the weld joint. The robot controller knows when the torch is approaching the edge or center of the weave cycle and captures data and performs TAST calculations based on the position of the torch. If a dedicated TAST controller is used, the main robot control processor can communicate torch position information to the TAST controller. The TAST data capture and calculations can be made very close to the edges or center of the weave, such as within $1/100$ inch-$1/10,000$ inch of the edges or center of the weave.

With the pulse welding waveforms discussed above, the current and voltage are constantly being changed among peaks, low current levels, background levels, etc. Successive TAST calculations could be influenced by which part of the welding waveform dominates when the TAST current/voltage measurements are made and TAST calculations performed. For example, one TAST calculation could be based primarily on a current pulse, while another is based primarily on a background current portion. This can lead to inaccuracies in the TAST calculations, which can result in over or under corrections to the seam tracking adjustments. To address this, in one embodiment, the welding power supply can make welding voltage and current measurements during welding, and provide filtered or tagged welding voltage and current data to the robot controller or TAST controller. The data is filtered or tagged according to the portion of the welding waveform the data corresponds to, such as peak or background. The welding power supply can receive torch position information from the robot controller and transmit the filtered or tagged welding voltage and current data as the torch approaches the edges or center of the weave. An example of filtered data is voltage and current data obtained from measurements made only during a peak pulse, or only during a background portion of the waveform (or some other portion of the welding waveform as desired). TAST calculations can then be performed using the filtered data, so that consistent portions of the welding waveform are used in successive TAST calculations. Voltage and current data concerning multiple, different portions of the welding waveform could also be provided to the robot controller or TAST controller, if the data is tagged or segmented, so that data from one portion of the welding waveform can be distinguished from data corresponding to another portion of the welding waveform (e.g., segmented in differentiable data blocks). Tagged data need not be segmented in differentiable data blocks because tagged data will include an appropriate identifier that is recognized by the TAST controller. TAST calculations can be made using selected portions of the welding waveform. Filtered or tagged data are classified or identified according to the portion of the welding waveform they correspond to, such as current measurements made during pulse current portions of the welding waveform, and current measurements made during low current portions of the waveform (e.g., a background portion).

In certain embodiments, the welding power supply can perform the TAST calculations and provide path correction instructions to the robot controller. In such embodiments, the welding power supply will include the TAST logic.

In another example embodiment, the welding power supply receives torch position information from the robot controller. As the torch nears the edges of the weave, the welding power supply adjusts the welding waveform to a predefined level used for TAST measurements. For example, a background current level or a pulse can be applied as the torch nears the edges of the weave. The robot controller or TAST controller can then make TAST measurements based on a consistent portion of the welding waveform.

Figure 15:
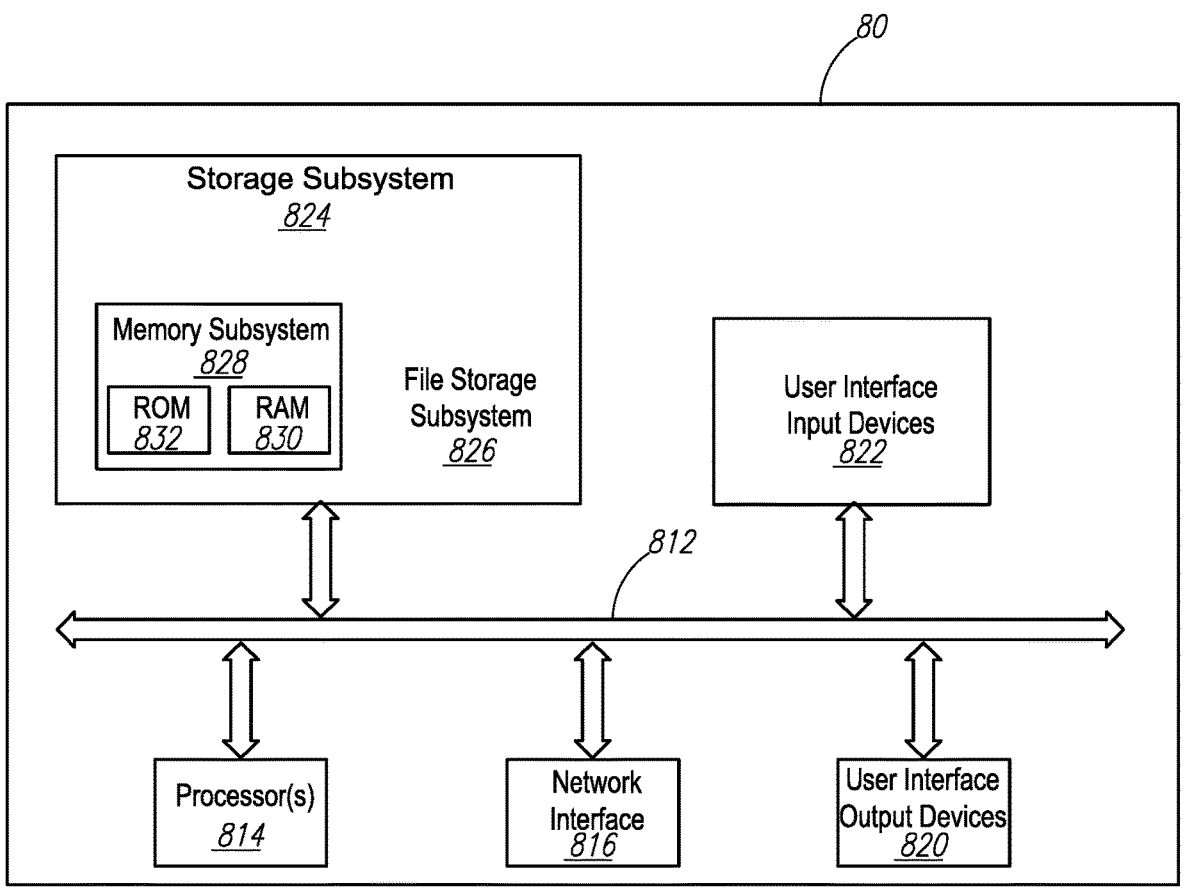
FIG. 15 is illustrates an embodiment of an example controller of a welding power supply.

FIG. 15 illustrates an embodiment of an example controller 80 of a welding power supply. The controller 80 includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with the controller 80. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 80 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 80 to the user or to another machine or computer system.

Storage subsystem 824 stores programming and data constructs that provide the functionality of some or all of the modules described herein. These software modules are generally executed by processor 814 alone or in combination with other processors. Memory 828 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the controller 80 communicate with each other as intended. Although bus subsystem 812 is shown schematically as a single bus, alternative embodiments of the bus subsystem may use multiple buses.

The controller 80 can be of varying types including a workstation, server, computing cluster, blade server, server farm, or any other data processing system or computing device. Due to the ever-changing nature of computing devices and networks, the description of the controller 80 depicted in FIG. 15 is intended only as a specific example for purposes of illustrating some embodiments. Many other configurations of the controller 80 are possible having more or fewer components than the controller depicted in FIG. 15.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A robotic electric arc welding system, comprising:
a welding torch;
a welding robot configured to manipulate the welding torch during a welding operation;
a robot controller operatively connected to the welding robot to control weaving movements of the welding torch along a weld seam and at a weave frequency and weave period; and
a welding power supply operatively connected to the welding torch to control a welding waveform, and operatively connected to the robot controller for communication therewith, wherein the welding power supply includes a programmable controller that is programmed to sample a plurality of weld parameters during a sampling period of the welding operation and form an analysis packet, and process the analysis packet to generate a weld quality score, wherein the welding waveform includes a peak current portion and a low current portion having a lower current level than the peak current portion and the welding waveform has a frequency in a range of 100-200 Hz,
wherein the welding power supply obtains the weave frequency or the weave period and automatically adjusts the sampling period for forming the analysis packet based on the weave frequency or the weave period, and
wherein the robotic electric arc welding system further comprises through arc seam tracking logic that tracks the weld seam and calculates corrections to a weld path from welding current data measured by the welding power supply during said peak current portion of the welding waveform and also classified by the welding power supply as corresponding to said peak current portion of the welding waveform.

2. The robotic electric arc welding system of claim 1, wherein the sampling period for forming the analysis packet equals the weave period.

3. The robotic electric arc welding system of claim 1, wherein the welding power supply receives the weave frequency from the robot controller.

4. The robotic electric arc welding system of claim 1, wherein the welding power supply receives the weave period from the robot controller.

5. The robotic electric arc welding system of claim 1, wherein the welding power supply receives torch position information from the robot controller during the welding operation.

6. The robotic electric arc welding system of claim 5, wherein the welding power supply automatically adjusts the sampling period for forming the analysis packet based on the torch position information.

7. The robotic electric arc welding system of claim 1, wherein the welding power supply records through arc seam tracking information corresponding to the weld quality score.

8. The robotic electric arc welding system of claim 1, wherein the welding current data is obtained by filtering welding current measurements according to corresponding peak current portions of the welding waveform such that only welding current data measured during respective peak current portions of the welding waveform are used by the through arc seam tracking logic in calculating the corrections to the weld path.

9. A robotic electric arc welding system, comprising:
a welding torch;
a welding robot configured to manipulate the welding torch during a welding operation;
a robot controller operatively connected to the welding robot to control weaving movements of the welding torch along a weld seam and at a weave frequency and weave period;
a welding power supply operatively connected to the welding torch to control a welding waveform, and operatively connected to the robot controller for communication therewith, wherein the welding power supply includes a programmable controller that is programmed to sample a plurality of weld parameters during a sampling period of the welding operation and form an analysis packet, and process the analysis packet to generate a weld quality score, wherein the welding waveform includes a peak current portion and a low current portion having a lower current level than the peak current portion and the welding waveform has a frequency in a range of 100-200 Hz,
wherein the welding power supply receives torch position information and automatically adjusts the sampling period for forming the analysis packet based on the torch position information, and
wherein the robotic electric arc welding system further comprises through arc seam tracking logic that tracks the weld seam and calculates corrections to a weld path from welding current data measured by the welding power supply during said peak current portion of the welding waveform and also classified by the welding power supply as corresponding to said peak current portion of the welding waveform.

10. The robotic electric arc welding system of claim 9, wherein the sampling period for forming the analysis packet equals the weave period.

11. The robotic electric arc welding system of claim 9, wherein the welding power supply receives the weave frequency from the robot controller.

12. The robotic electric arc welding system of claim 9, wherein the welding power supply receives the weave period from the robot controller.

13. The robotic electric arc welding system of claim 9, wherein the welding power supply records through arc seam tracking information corresponding to the weld quality score.

14. The robotic electric arc welding system of claim 9, wherein the welding current data is obtained by filtering welding current measurements according to corresponding peak current portions of the welding waveform such that only welding current data measured during respective peak current portions of the welding waveform are used by the through arc seam tracking logic in calculating the corrections to the weld path.

15. A robotic electric arc welding system, comprising:
a welding torch;
a welding robot configured to manipulate the welding torch during a welding operation;
a robot controller operatively connected to the welding robot to control weaving movements of the welding torch along a weld path that follows a weld seam; and
a welding power supply operatively connected to the welding torch to control a welding waveform, and operatively connected to the robot controller for communication therewith, wherein the welding waveform includes a peak current portion, and a low current portion having a lower current level than the peak current portion, and the welding waveform has a frequency in a range of 100-200 Hz,
wherein the robotic electric arc welding system includes through arc seam tracking logic that tracks the weld seam and calculates corrections to the weld path, and
wherein the through arc seam tracking logic calculates the corrections to the weld path from welding current data, provided by the welding power supply and measured during said peak current portion of the welding waveform, and also classified by the welding power supply as corresponding to said peak current portion of the welding waveform, wherein welding current data classified as corresponding to the low current portion of the welding waveform is excluded from calculations of said corrections to the weld path.

16. The robotic electric arc welding system of claim 15, wherein the welding current data is obtained by filtering welding current measurements according to a corresponding portion of the welding waveform.

17. The robotic electric arc welding system of claim 15, wherein the welding current data is segmented according to either one of the peak current portion and the low current portion of the welding waveform.

18. The robotic electric arc welding system of claim 15, wherein the welding current data is tagged as corresponding to either one of the peak current portion and the low current portion of the welding waveform.

19. The robotic electric arc welding system of claim 15, wherein the welding power supply is configured to sample a plurality of weld parameters during a sampling period of the welding operation and form an analysis packet, and process the analysis packet to generate a weld quality score, wherein the welding power supply obtains a weave frequency or a weave period of the weaving movements and automatically adjusts the sampling period for forming the analysis packet based on the weave frequency or the weave period.

* * * * *